United States Patent
Chun et al.

(10) Patent No.: US 7,326,008 B2
(45) Date of Patent: Feb. 5, 2008

(54) SERVO TAPPING UNIT WITH BUILT IN SHOCK PROTECTION

(75) Inventors: Victor L. Chun, Walton Hills, OH (US); Frank Madej, Mentor, OH (US); Alexander B. Leibman, Strongsville, OH (US)

(73) Assignee: Danly IEM, LLC, Boston, MA (US)

( * ) Notice: Subject to any disclaimer, the term of this patent is extended or adjusted under 35 U.S.C. 154(b) by 427 days.

(21) Appl. No.: 11/009,536

(22) Filed: Dec. 10, 2004

(65) Prior Publication Data

US 2006/0127191 A1    Jun. 15, 2006

(51) Int. Cl.
*B23B 47/04* (2006.01)
*B23B 47/18* (2006.01)
*B23G 1/16* (2006.01)

(52) U.S. Cl. ............ 408/1 R; 408/124; 408/710; 72/465.1; 72/455

(58) Field of Classification Search ........... 408/100, 408/101, 102, 110, 112, 124, 137, 710, 1 R; 72/455, 465.1
See application file for complete search history.

(56) References Cited

U.S. PATENT DOCUMENTS

| | | | | |
|---|---|---|---|---|
| 2,314,138 | A | * | 3/1943 | Garbe et al. ............ 408/68 |
| 2,346,297 | A | * | 4/1944 | Garbe ................... 408/130 |
| 3,125,917 | A | * | 3/1964 | Smeets .................. 83/140 |
| 3,162,873 | A | * | 12/1964 | Ohme ................... 408/98 |
| 3,348,248 | A | * | 10/1967 | Milkert ................. 408/1 R |
| 3,496,818 | A | * | 2/1970 | Porter et al. ........... 83/140 |
| 3,540,339 | A | * | 11/1970 | Killaly ................... 83/140 |
| 3,579,687 | A | * | 5/1971 | Hoshi et al. ........... 470/96 |
| 3,733,944 | A | * | 5/1973 | Dietrick et al. ......... 83/62 |
| 3,788,760 | A | | 1/1974 | Daniels |
| 4,007,653 | A | * | 2/1977 | Cady ..................... 83/140 |
| 4,449,868 | A | * | 5/1984 | Steinsberger et al. .... 408/138 |
| 4,578,004 | A | * | 3/1986 | Reil ...................... 408/87 |
| 4,658,688 | A | * | 4/1987 | Shah et al. ............ 83/552 |
| 5,025,691 | A | * | 6/1991 | Deni ..................... 83/140 |
| 5,048,385 | A | * | 9/1991 | Eckert et al. .......... 83/34 |

(Continued)

FOREIGN PATENT DOCUMENTS

| EP | 399337 A1 | * | 11/1990 |
|---|---|---|---|
| EP | 399338 A1 | * | 11/1990 |
| EP | 399339 A1 | * | 11/1990 |

OTHER PUBLICATIONS

PRONIC™ Diagram No. P SMI-E dated May 5, 1997.

(Continued)

*Primary Examiner*—Monica Carter
*Assistant Examiner*—Michael W. Talbot
(74) *Attorney, Agent, or Firm*—Schnader Harrison Segal & Lewis, LLP (57) ABSTRACT

A servo motor in die tapping unit provides built in shock protection for the motor by fixing a shock plate to the servo motor and floatingly mounting the shock plate to a base structure attachable to a stripper plate in a press. Sets of opposing springs allow movement of the shock plate relative the base plate to relieve shock loads when the press is operated, the shock plate guided on dowel pins fixed to the base structure. The shock plate, and tapping unit and base structure form a self contained assembly for mounting together in the press.

14 Claims, 7 Drawing Sheets

U.S. PATENT DOCUMENTS

| | | | | |
|---|---|---|---|---|
| 5,173,015 | A | * | 12/1992 | Maynard .................... 408/137 |
| 5,201,589 | A | * | 4/1993 | Chun et al. ................. 400/134 |
| 5,706,902 | A | | 1/1998 | Eisenhardt |
| 6,152,659 | A | | 11/2000 | Seki |
| 6,547,496 | B2 | | 4/2003 | Chun et al. |
| 7,192,223 | B2 | * | 3/2007 | Chun et al. ................. 408/137 |
| 2004/0009044 | A1 | * | 1/2004 | Chun et al. ................. 408/124 |

OTHER PUBLICATIONS

*PRONIC*™ Diagram No. P PF-E, all dated May 13, 1997.
*PRONIC*™ Diagrams, 4 diagrams, Diagram Nos. P PFX-E; P SM-E; P SMX-E and P FX-E all dated May 27, 1997.
International Search Report for PCT Patent Application No. PCT/US05/41296, having a mailing date of Jun. 20, 2007.

* cited by examiner

SERVO TAPPING UNIT WITH BUILT IN SHOCK PROTECTION

BACKGROUND OF THE INVENTION

This invention concerns in die tapping devices which are used to tap holes in workpieces being formed by dies installed in presses.

Such tapping devices have often been operated by the motion of the press, as described in U.S. Pat. No. 6,547,496. Since the tap drive is dependent on the sinusoidal press motion, significant limitations on tapping speed results, increasing the cycle time for the process.

Thus, electrical servo motor drives have been developed for in-die tapping units in which servo motors mounted to the tapping unit are used to drive the tap, as described in copending U.S. application Ser. No. 10/417,428, filed on Apr. 15, 2003.

The tap drive is made independent of the press motion by the use of servo motors, and this allows driving of the tap at maximum speed to reduce cycle times.

A significant problem is created by mounting a servo motor to a tapping unit in that the servo motor is thereby subjected to shock loading when the stripper plate impacts the workpiece and fixture, and suddenly decelerates the servo motor, shortening the service life of the motor.

Typically, spring mounted stripper plates carry the tapping units and the stripper plate springs have been relied on to reduce the shock loading of servo motors.

However, the stripper plates comprise a separately supplied component from the tapping unit, and the stripper plate springs are not designed specifically to adequately attenuate shock loading of the associated servo motor in this application.

The user of this equipment must therefore attempt to design proper stripper springs to reduce shock loading of the motors to acceptable. This necessity is often neglected to the detriment of the service life of the servo motors.

Accordingly, it is an object of the present invention to provide an effective shock protection for servo motor driven die tapping units which does not rely on stripper plate springs to reduce shock or require a special design of the stripper plate springs to provide shock protection.

SUMMARY OF THE INVENTION

The above object and other objects which will become apparent upon a reading of the following specification and claims are achieved by providing built in shock protection combined with the servo motor tapping unit itself. In a first embodiment, a shock plate to which the tapping unit is fixed, extends horizontally over an aligned parallel base structure attached to an associated stripper plate, the shock plate floatingly mounted to the base structure by opposing resiliently deflectable elements.

A series of upwardly projecting guide pins are fixed at one end to the base structure and slidably received in the shock plate to guide relative vertical movement of the shock plate and tapping unit.

Two sets of opposed compression springs act to resiliently position the shock plate closely spaced above the base plate, the spring rates and spacing of the shock plate set to reduce the maximum shock loading to a predetermined acceptable level. This floating mount allows limited relative movement between shock and base plates when impacting of a stripper plate occurs during press cycling. This attenuates the shock loading of the tapping unit mounted on the shock plate to a level where damage to the servo motor is avoided.

In a second, vertically oriented motor embodiment, the servo motor is attached to a shock plate. A tooling housing is located spaced beneath the shock plate and is directly attached to a stripper plate. A series of pins guide movement of the shock plate relative to the tooling housing, which mounts a tap drive and holder assembly.

A first set of compression springs are interposed between the shock plate and housing recessed in pockets in the shock plate, compliantly resisting downward movement of the shock plate.

A second set of compression springs are received in a respective bore in the shock plate and are each compressed beneath a washer secured by a machine screw to the base structure engaged against a rim at the bottom of a respective shock plate bore. The second set of springs compliantly resists upward movement of the shock plate, such that the shock loading when the stripper impacts the workpiece and/or fixture and when the stripper reverses direction, is greatly attenuated.

In a third embodiment, a housing comprising the base structure has a portion which extends alongside the servo motor axis and a tool drive and holder assembly is mounted to be offset to the servo motor axis. A shock plate is interposed between the motor and one end of the housing.

In all of these embodiments, the spring rates, number of springs and shock plate spacing from the base are designed for mass of the particular tapping unit to properly attenuate the shock loading to a predetermined safe maximum level.

The assembly of the tapping unit, shock plate base structure, and springs is installed as an assembly onto the stripper plate to minimize the burden on the user and to insure proper protection for the servo motor.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings and particularly FIGS. 1-4, an upper platen 10 and lower platen 12 of a press is shown with a workpiece 14, such as an elongated strip formed with holes to be tapped, extending across a fixture 16 installed on the lower platen 12.

Figure 1:
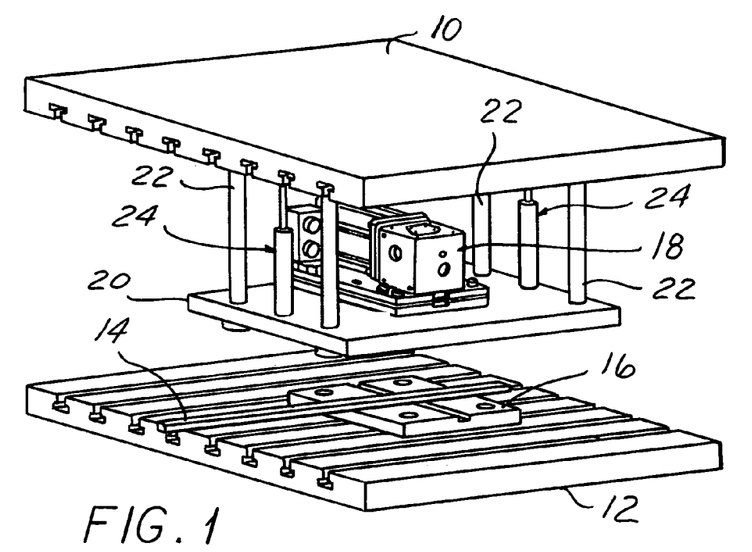
FIG. 1 is a pictorial view of a first embodiment of a tapping unit having built in shock protection assembly installed onto a stripper plate, with press platens and a workpiece also shown.

A tapping unit 18 for tapping the holes formed in the workpiece 14 is mounted together with shock plate 30 and base structure 32 on a stripper plate 20 movably suspended on supports 22 with gas springs 24 urging the plate 20 to a down position on the supports 22.

After the press is operated to bring the stripper plate 20 against the workpiece 14 on the fixture 16, the tapping unit 18 is operated to advance and rotate the tap in a hole in the workpiece 14 in the well known manner.

Figure 2:
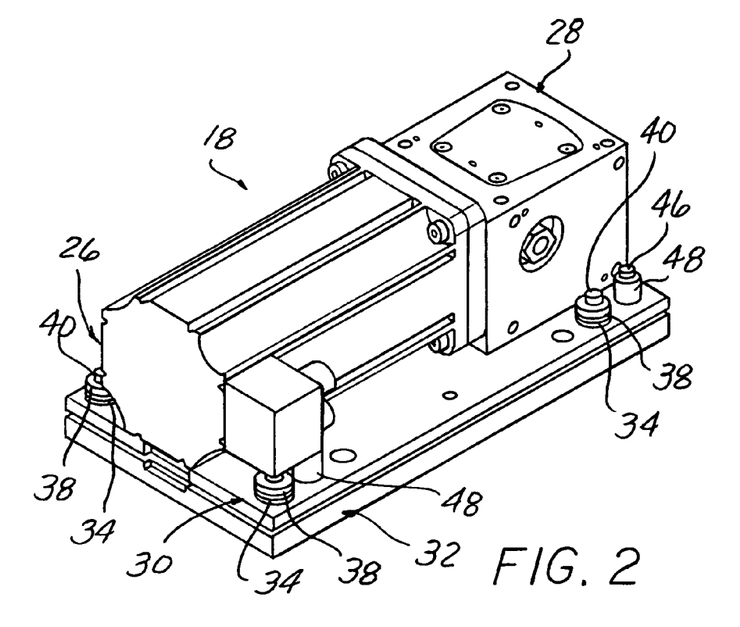
FIG. 2 is an enlarge pictorial view of the tapping unit shock plate assembly shown in FIG. 1.
Figure 3:
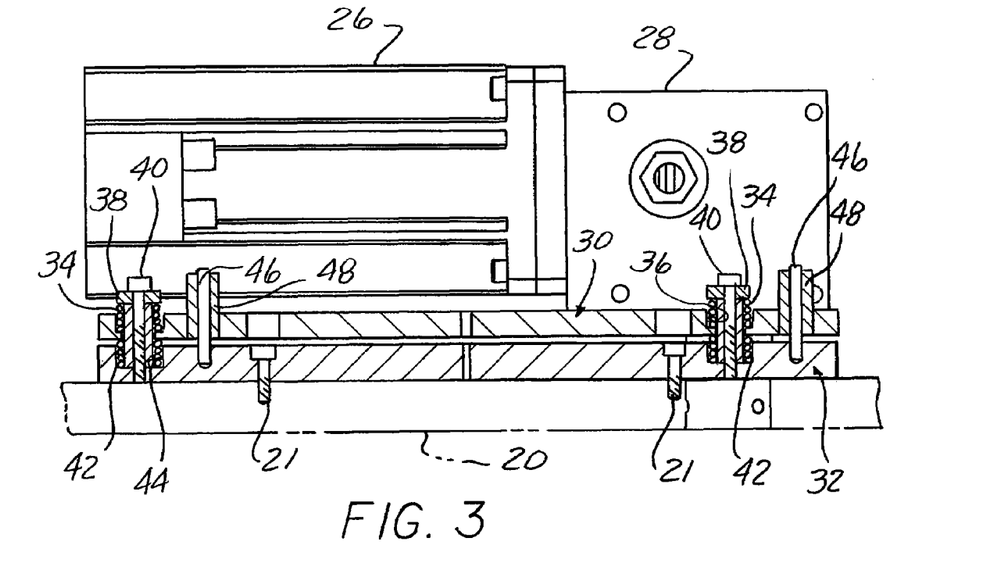
FIG. 3 is a side elevational view of the tapping unit shown in FIGS. 1 and 2.

As seen in FIG. 2, the tapping unit 18 is comprised of a horizontally oriented servo motor 26 having a transmission housing 28 attached at one end, which motor and housing in turn is mounted to a horizontally extending shock plate 30 underlying the motor 26 and housing 28 which is fixed to the shock plate 30 with suitable fasteners (not shown).

The shock plate 30 in turn is floatingly mounted on a base structure comprising a plate 32 to form a tapping unit with built in shock protection. This assembly is affixed to the stripper plate 20 with screws 21 when being installed in a press.

The shock plate 30 is floatingly mounted at a predetermined space above the base plate 32 by opposing resiliently deflectable elements comprising two opposing sets of four springs each.

The springs 34 in an upper set are received in a respective counterbore pockets 36 and compressed therein by a washer 38 and machine screw 40 received in base plate 32 to urge the shock plate 30 downwardly.

The opposing springs 42 of a lower set are received in respective lower counterbore pockets 44 and engaged with the undersurface of shock plate 30 to urge the same upwardly, counteracting the springs 34 so that the shock plate 30 thus floats above the base plate 32 with a predetermined gap between the shock plate 30 and base plate 32.

A set of four dowel pins 46 are press fit into holes in the base plate 32 and extending vertically and slidably received into bushing sleeves 48 fit in holes in the shock plate 30. This guides the vertical motion of the shock plate 30 induced by shocks experienced by the tapping unit assembly during press operation.

Figure 4:
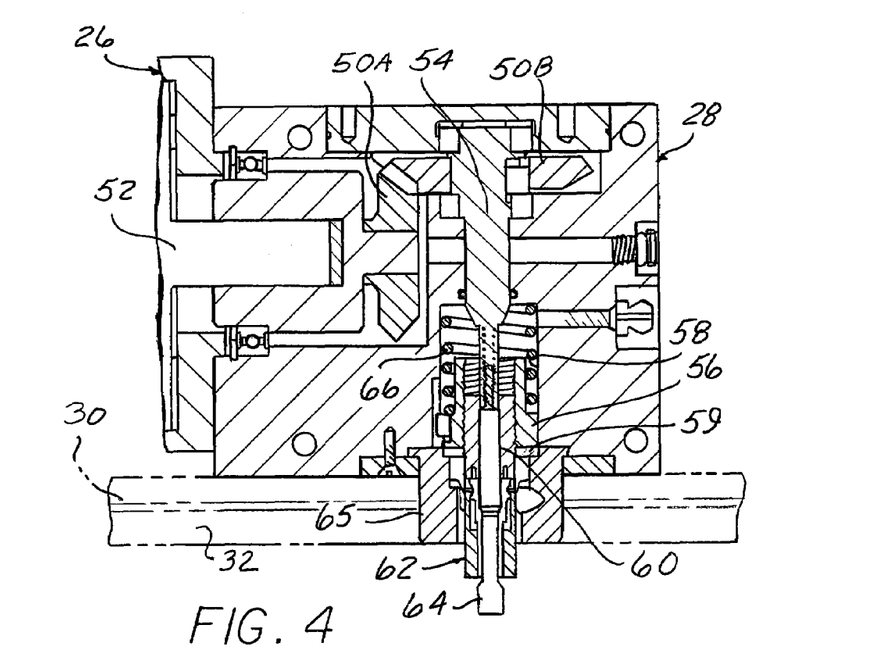
FIG. 4 is a fragmentary view of the tapping unit shown in FIG. 3 showing the internal details of the tap drive and holder components.

The transmission housing 28 contains bevel gears 50A, 50B driven by the output shaft 52 of the servo motor 26. A polygon drive shaft 54 is rotated by gear 50B which in turn drives a lead screw 60 threaded into a bushing 56 nonrotatably held in a bore 58 in the housing 28 by a key 59. The lead screw 60 mounts a tap holder 62 releasably holding a tap 64. The lead screw 60 advances axially when rotated to advance and rotate the tap 64 when tapping a hole in the well known manner. A safety spring 66 allows the bushing 56 to be retracted if the tap 64 is blocked from advancing, as could happen if the hole to be tapped is not formed properly or is absent. A nose piece 65 holds tap holder 62 to transmission housing 28, and serves as a pilot registration for concentric alignment of tap 64 to the hole to be tapped in the workpiece 14.

Thus, excessive shock loading of the servo motor 26 is prevented by being mounted to the floating shock plate 30 which is spaced above the base plate 32 by the springs 34, 42. The springs 34, 42 are matched to the mass of the tapping unit, and the tapping unit, shock plate and base plate installed as a single package with built in shock prevention so as to not require any shock prevention measures to be undertaken by the user.

The following formulas have been used to insure that a predetermined maximum deceleration is not exceeded:

$$\Delta x = \sqrt{\frac{mV^2}{(N_B + N_T)K}} \quad (1)$$

$$a = \frac{V^2}{\sqrt{\frac{mV^2}{(N_B + N_T)}K}} \quad (2)$$

$$a = \frac{V^2}{2(\Delta x)} \quad (3)$$

m=Mass of motor
V=Velocity of press
$N_B$=Number of springs on bottom
NT=Number of springs on top
K=Spring stiffness
Δx=Gap between bottom of shock plate and base structure
a=Acceleration The number of springs and their rate and the gap between the shock plate and base can be varied to insure that the maximum deceleration will not exceed a predetermined maximum value, usually under 5 g's.

In one example, four springs in each set having a spring rate of 143 pounds per inch, a press speed of 12 inches/second, and a gap of 0.06 inches produced a deceleration of less than 4 g's for the servo motor used.

FIGS. 5-8 show a second embodiment of the invention featuring a servo tapping unit 68 in which a servo motor 70 is vertically oriented within a press, mounted on a stripper plate 72 suspended from the press upper platen 10 as in the first described embodiment.

Figure 5:
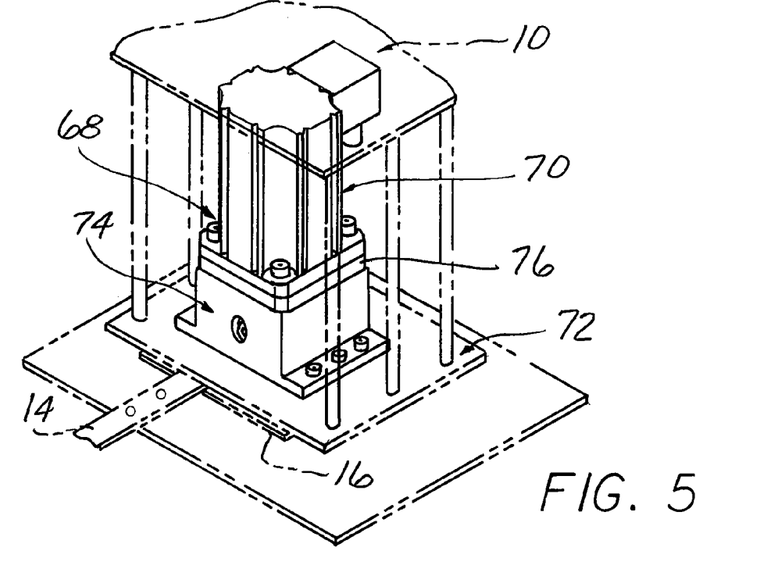
FIG. 5 is a pictorial view of a second embodiment of a tapping unit according to the present invention, also showing in phantom lines the outline of press platens and a stripper plate.
Figure 6:
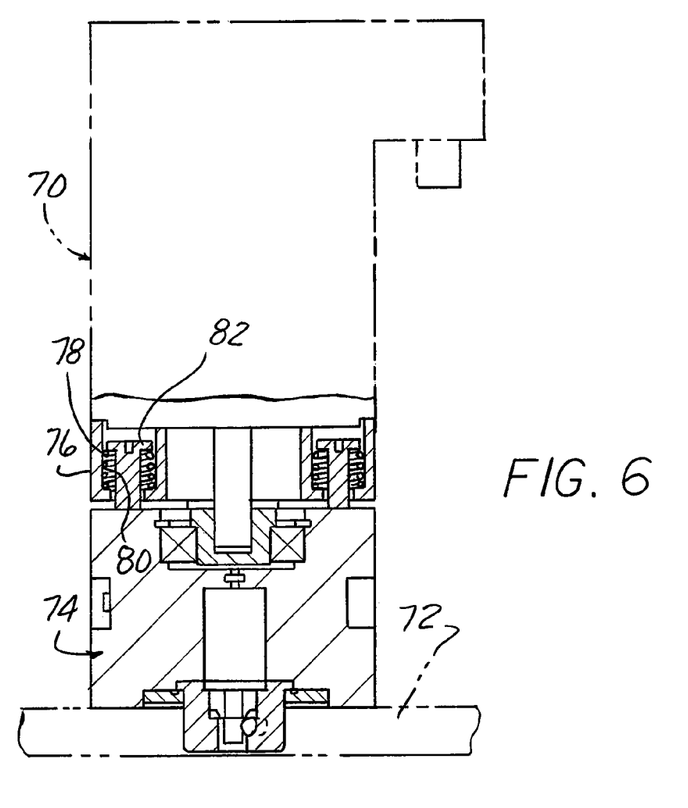
FIG. 6 is a partially sectional elevation view of the second embodiment shown in FIG. 5.

A base structure comprising a housing 74 is attached to the stripper plate 72 which supports the servo motor 70 with an interposed shock plate 76.

Figure 7:
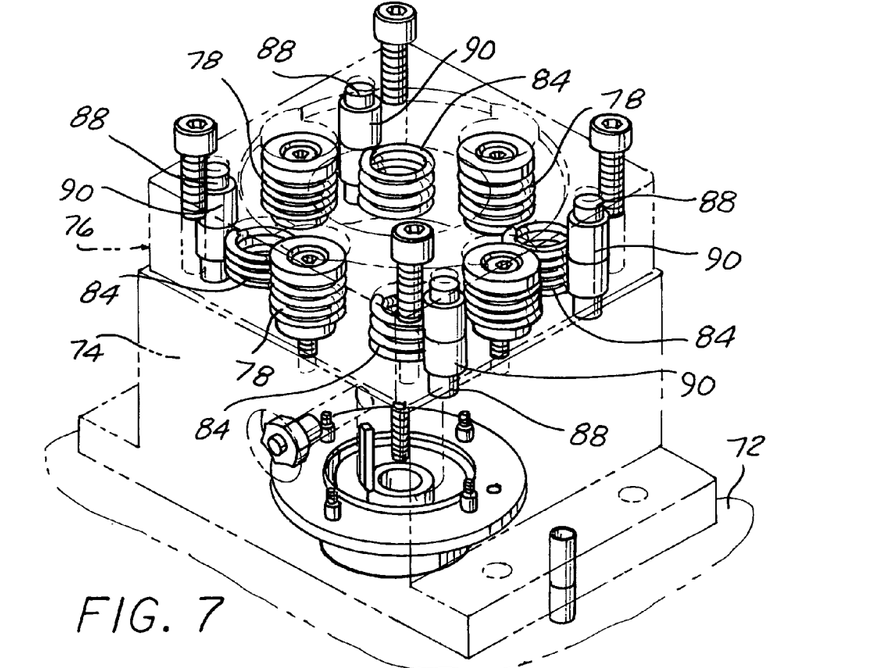
FIG. 7 is a pictorial enlarged view of the second embodiment with the shock plate and transmission housing shown in phantom lines to reveal the springs and guide pins mounting the shock plate to the transmission housing.
Figure 8:
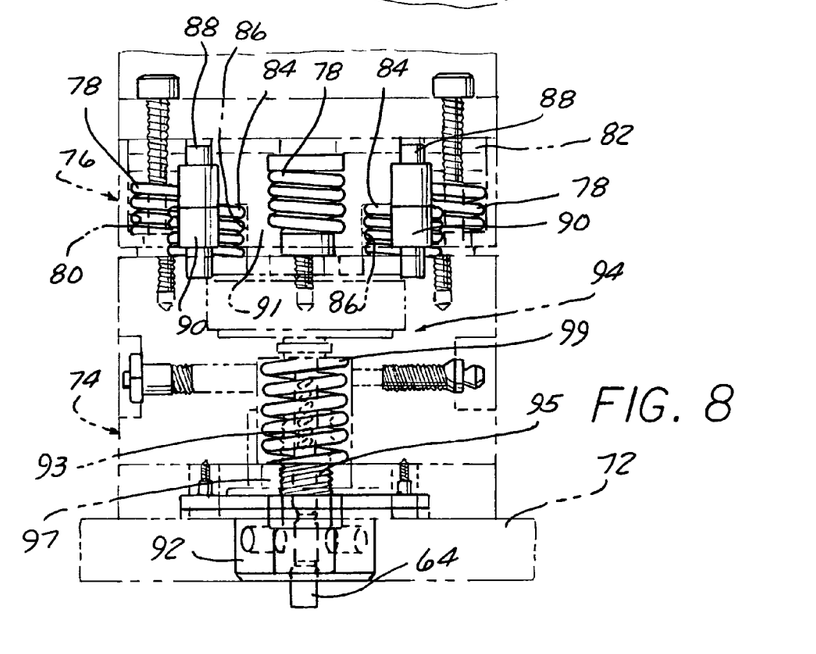
FIG. 8 is an elevational view of the components shown in FIG. 7.

The interposed shock plate 76 is floatingly supported at a spaced location above the base housing 74 by two opposing sets of four springs each. A first set of springs 78 are each received in a respective upwardly facing counterbore 80 in the shock plate 76, compressed beneath a headed screw 82 threaded into a hole in the top of the base 74 to act to urge the shock plate 76 downwardly.

A second set of four springs 84 are each received in a downwardly facing counterbore 86 in the shock plate 76 compressed against the upper surface of the base housing 74 to urge the shock plate upwardly.

A set of dowels 88 are press fit in holes in the base housing 74 and slidably received in bushing sleeves 90. This guides any movement of the shock plate 76 due to shock loading by press operation causing impacting of the stripper plate 72 on the workpiece 14 and fixture 16.

Suitable tap holder and drive components 94 as shown are mounted within the base housing 74.

These include a polygonal drive element 93 having a square drive end received in a square hole in a tap holder plug 95 threaded in a lead screw sleeve 97 keyed to be nonrotatable but able to axially advance against the force of safety spring 99 if the tap 64 cannot advance.

A nose piece 92 holds a tap holder to base housing 74, and serves as a pilot registration for the concentric alignment of tap 64 to the hole to be tapped in workpiece 14.

FIGS. 9-14 show a third embodiment of a tapping unit with shock protection according to the invention.

Figure 9:
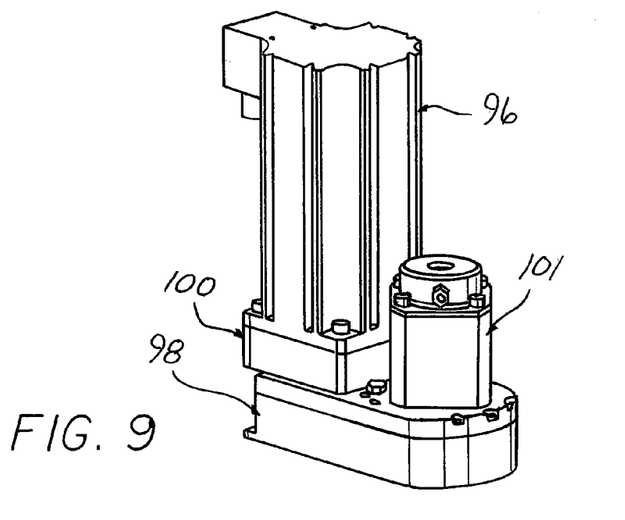
FIG. 9 is a pictorial view of a third embodiment of a tapping unit according to the invention.

In this embodiment, a vertically oriented servo motor 96 is mounted on a base structure comprising a housing 98 with a floating interposed shock plate 100.

A tap holder and drive housing 101 is mounted on a housing section offset horizontally from the axis of the servo motor 96.

The shock plate 100 is resiliently float mounted above the housing 98 as in the other embodiments with two opposing sets of four springs. A first set of four springs 102 are received in respective upward facing counterbores 104. The springs 102 are compressed against end walls at the bottom of counterbores 104 by the heads of screws 106 threaded into the base housing 98 to urge the shock plate 100 downwardly. A set of spacer-bushings 108 limit the extent of compression of the springs 102.

A second opposing set of four springs 110 are received in downwardly facing bores 112 in the shock plate 100 compressed against the upper surface of the base housing 98 to urge the shock plate 100 upwardly, balancing the effect of the springs 102 so that the shock plate 100 with the servo motor 96 floats above the base housing 98.

A set of four dowel pins 114 are press fit into holes in the base housing 98 at their lower ends projecting up and slidable in bushings 116 carried in bores in the shock plate 100. This guides the vertical movement of the shock plate and servo motor 96 induced by shock loading when the press is operated, as in the above described first and second embodiments.

Figure 10:
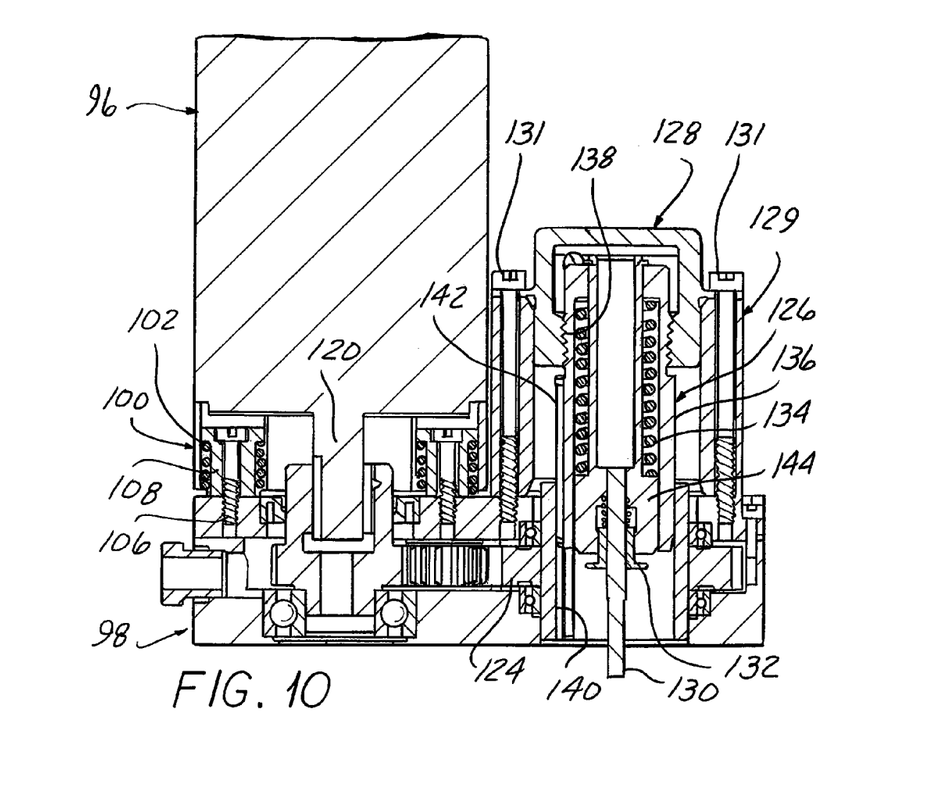
FIG. 10 is a vertical sectional view through the lower part of the tapping unit shown in FIG. 9.
Figure 11:
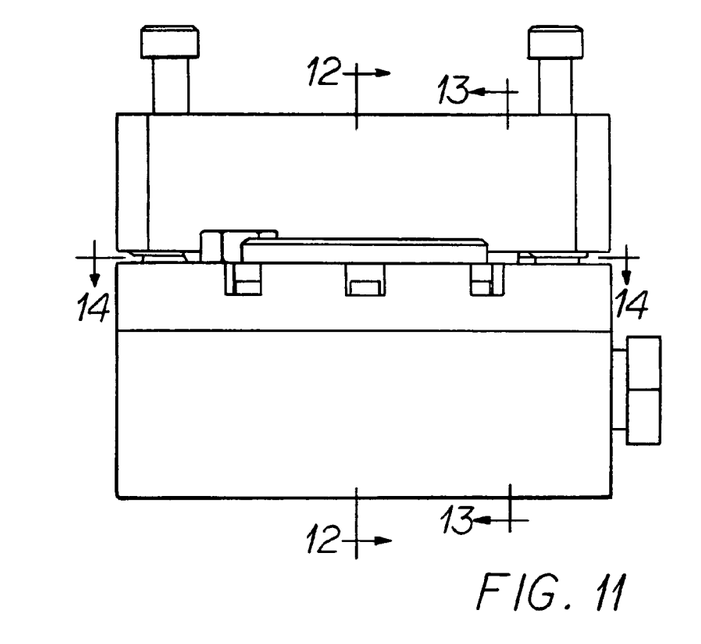
FIG. 11 is an end view of the shock plate and transmission housing components of the tapping unit shown in FIGS. 9 and 10.
Figure 12:
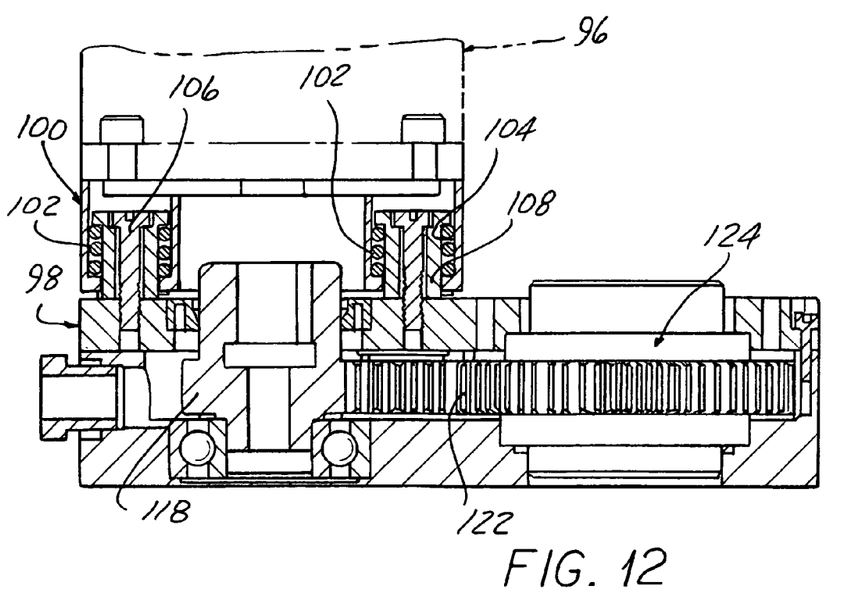
FIG. 12 is a view of the section 12-12 taken in FIG. 11.
Figure 13:
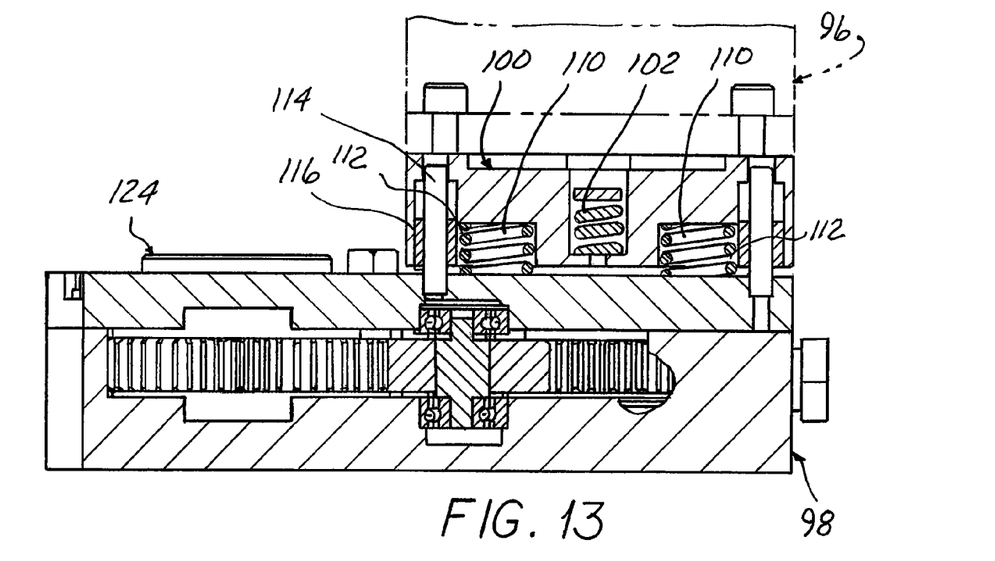
FIG. 13 is a view of the section 13-13 taken in FIG. 11.
Figure 14:
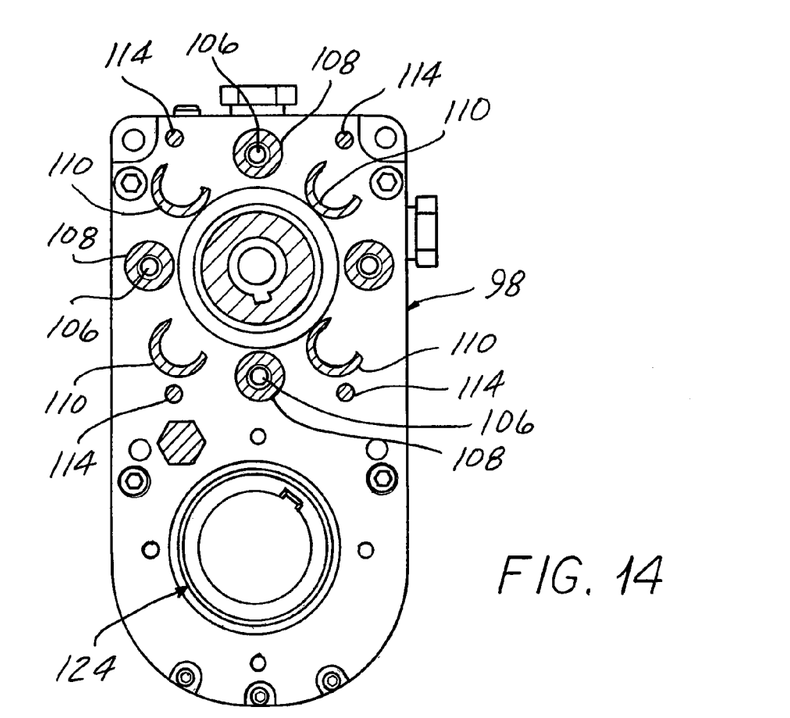
FIG. 14 is a view of the section 14-14 taken in FIG. 11.

The base housing 98 contains a gear 118 driven by the servo motor output shaft 120 which drives an idler gear 122, driving a gear hub 124. Gear hub 124 rotates a tap holder assembly 126 housed within a cover 128 and annular extension 129 fixed onto the base housing 98 with bolts 131.

An outer sleeve 136 has a threaded engagement with internal threads 138 of the cap 128. A keyway 140 and key 142 establish a rotational connection with the gear hub 124 while allowing axial movement.

This causes downward advance of the tap holder assembly 126 and a tap 130 secured therein with an included tap holder 132 carrier by an inner sleeve 144.

A safety spring 134 is interposed between the outer sleeve 136 and inner sleeve 144 to allow the outer sleeve 136 to move down even if the inner sleeve 144 cannot advance for some reason.

The invention claimed is:

1. A tapping unit with built in shock protection adapted to be mounted on a stripper plate in a forming press, comprising:
    a servo motor;
    a shock plate disposed between said servo motor and a base structure;
    said base structure adapted to be fixed to said stripper plate;
    a resilient floating mounting connecting said shock plate to said base structure allowing limited movement towards or away from said base structure, said resilient float mounting attenuating shock loading of said servo motor to a predetermined maximum acceleration;
    wherein said resilient floating mounting comprises opposing resiliently deflective elements.

2. The assembly according to claim 1 wherein said floating mounting comprises two sets of springs acting on said shock plate, a first set of springs urging said shock plate towards said base structure, and a second opposing set of springs urging said shock plate away from said base structure, the effect of said two sets of springs normally balanced to position said shock plate and attached servo motor positioned apart from said base structure.

3. The assembly according to claim 2 further including guide elements attached to said base structure and slidably received in openings in said shock plate to guide movement of said shock plate caused by shock loading thereof when said press is operated.

4. The assembly according to claim 3 wherein said guide elements comprise a set of dowel pins fixed to said base structure and extending into openings in said shock plate.

5. The assembly according to claim 2 wherein each of said springs in said first set are compressed against a rim of a bore in said shock plate by a headed threaded fastener threaded into said base structure.

6. The assembly according to claim 5 wherein each of said springs in said second set are received in downwardly facing bores in said shock plate and engaged with an upper surface of said base structure.

7. The assembly according to claim 1 wherein said servo motor extends horizontally on said stripper plate and said shock plate extends alongside said servo motor.

8. The assembly according to claim 1 wherein said servo motor extends vertically from said shock plate and said shock plate is affixed to a lower end of said servo motor.

9. A method of protecting a servo motor from excessive shock loading when installed on a stripper plate in a press to drive a tool for forming a thread in a hole in a workpiece in said press, said workpiece engaged by said stripper plate during press operation, the method comprising:
    attaching a shock plate between said servo motor and a base structure;
    attaching said base structure to said stripper plate; and
    floatingly mounting said shock plate spaced above said base structure by opposing resiliently deflectable elements to allow relative movement therebetween so that said shock plate, base structure, and servo motor form a single assembly.

10. The method according to claim 9 wherein said shock plate is floatingly mounted above said base structure by opposing sets of springs allowing said relative movement with respect to said base structure.

11. The method according to claim 10 wherein said sets of springs are arranged so that one of said sets of springs acts to urge said shock plate toward said base structure and said other of said set of springs urges said shock plate away from said base structure.

12. The method according to claim 10 further including guiding said shock plate on a set of guide elements affixed to said base structure and slidable in said shock plate.

13. A tapping unit with built in shock protection adapted to be mounted on a stripper plate in a forming press, comprising:
- a servo motor;
- a shock plate attached to said servo motor;
- a base structure adapted to be fixed to said stripper plate;
- a resilient floating mounting of said shock plate spaced above said base structure allowing limited movement towards or away from said base structure, said resilient float mounting attenuating shock loading of said servo motor to a predetermined maximum acceleration;
- wherein said floating mounting comprises two sets of springs acting on said shock plate, a first set of springs urging said shock plate towards said base structure, and a second opposing set of springs urging said shock plate away from said base structure, the effect of said two sets of springs normally balanced to position said shock plate and attached servo motor positioned apart from said base structure.

14. A method of protecting a servo motor from excessive shock loading when installed on a stripper plate in a press to drive a tool for forming a thread in a hole in a workpiece in said press, said workpiece engaged by said stripper plate during press operation, the method comprising:
- attaching a shock plate to said servo motor;
- attaching a base structure to said stripper plate;
- floatingly mounting said shock plate spaced above said base structure by opposing resiliently deflectable elements to allow relative movement therebetween so that said shock plate, base structure and servo motor form a single assembly; and
- wherein said shock plate is floatingly mounted above said base structure by opposing sets of springs allowing said relative movement with respect to said base structure.

* * * * *